United States Patent [19]

Walton

[11] Patent Number: 4,928,111

[45] Date of Patent: May 22, 1990

[54] METHOD FOR OPERATING A VALVE

[75] Inventor: Robert L. Walton, Rushden, England

[73] Assignee: Willett International Limited, Bucks, England

[21] Appl. No.: 331,840

[22] Filed: Apr. 3, 1989

[30] Foreign Application Priority Data

Dec. 1, 1988 [GB] United Kingdom ............... 8828046

[51] Int. Cl.⁵ .............................................. G01D 9/00
[52] U.S. Cl. ................... 346/1.1; 346/160 R; 346/75
[58] Field of Search ........................... 346/1.1, 140, 75

[56] References Cited

U.S. PATENT DOCUMENTS

| | | | |
|---|---|---|---|
| 4,378,564 | 3/1983 | Cross et al. | 346/75 |
| 4,539,570 | 9/1985 | Moore | 346/1.1 |
| 4,780,728 | 10/1988 | Post | 346/1.1 |

Primary Examiner—George H. Miller, Jr.
Assistant Examiner—Huan Tran
Attorney, Agent, or Firm—Charles D. Gunter, Jr.

[57] ABSTRACT

The present invention relates to a method for operating an electromagnetic valve means comprising a valve plunger journalled within a valve body for movement under the influence of an electric current on a drive stroke from a valve closed position to a valve open position, which valve means controls the flow of fluid to a nozzle orifice in a non-contact fluid droplet applicator apparatus, notably an ink jet printer, which method comprises intermittently applying a transient drive current to the valve means which is insufficient to move the plunger sufficiently on its drive stroke towards the valve open position to permit the flow of fluid through the valve.

8 Claims, 2 Drawing Sheets

METHOD FOR OPERATING A VALVE

The present invention relates to a method for operating a valve, notably a reciprocating plunger type of valve in an ink jet printer.

BACKGROUND TO THE INVENTION

In one form of drop on demand non-contact fluid droplet applicator, for example an ink jet printer, fluid is supplied under pressure to an array of nozzle orifices arranged so that droplets ejected from the nozzle orifices are applied to a substrate to form the desired image. The substrate moves relative to the orifices and fluid is allowed to flow to the nozzles in the desired sequence under the control of a valve mechanism in the fluid flow lines serving each nozzle. Typically, the valve is a solenoid type valve in which a plunger carrying a sealing member moves in and out of engagement with the outlet to a chamber fed with ink under a pressure of from 0.1 to 2 bar from the ink reservoir.

With an ink jet printer the objective is to form sharply defined images on the paper composed of a number of droplets ejected from the nozzle array. However, it has been found that at least some of the droplets emitted by the nozzles when the printer is started after a rest period, for example a pause during printing or even when a particular nozzle has not been utilised for some reason during part of a print run, are not uniform or may not be emitted at all from the nozzle orifice.

We have found that the valve plunger will, over a period of time, tend to move forward under the influence of the return spring after it has nominally seated into its valve closed position and closed the orifice. This "creep" occurs due to the resilient nature of the material used for the sealing member and/or the valve seat. The effect of this creep is to increase the separation between the magnetic pole faces formed by the moveable plunger and the fixed components of the valve construction. The resilient nature of the material also allows the material of the sealing member to deform around the member bearing against and this may provide a measure of grip between the sealing members. We believe that both these factors contribute to variable droplet ejection after periods of rest.

We have devised a method for reducing this problem without the need to modify the design or construction of the valve.

SUMMARY OF THE INVENTION

Accordingly, the present invention provides a method for operating an electromagnetic valve means, notably a solenoid valve, controlling the flow of fluid to a nozzle orifice in a non-contact fluid droplet applicator, which method comprises intermittently applying a transient drive current to the valve means which is not sufficient to open the valve, for example by lifting the valve head from its seat, or to permit the flow of fluid through the valve.

The present invention also provides a non-contact fluid droplet applicator which is adapted to emit droplets of fluid upon the operation of a valve means, notably a solenoid valve mechanism, under the control of a programmed control means, characterised in that the said control means is programmed to cause a transient drive current to be applied to the said valve means not sufficient to open the valve means or to permit the flow of fluid through the valve.

The invention also provides a programmable control means for operating a valve means to regulate the flow of fluid in a non-contact fluid droplet applicator which has been programmed to cause a transient drive current to be applied to the valve means which is not sufficient to open the valve means or to permit the flow of fluid through the valve.

DESCRIPTION OF THE DRAWING

The invention is of especial application to the operation of a solenoid valve for controlling the flow of ink through a nozzle in an ink jet printer in which the fluid is an ink. For convenience, the invention will be described hereinafter with respect to this preferred application and with respect to accompanying drawing which is a diagrammatic cross-section through the solenoid valve in such a printer.

DESCRIPTION OF THE PREFERRED EMBODIMENT

Figure 1A:
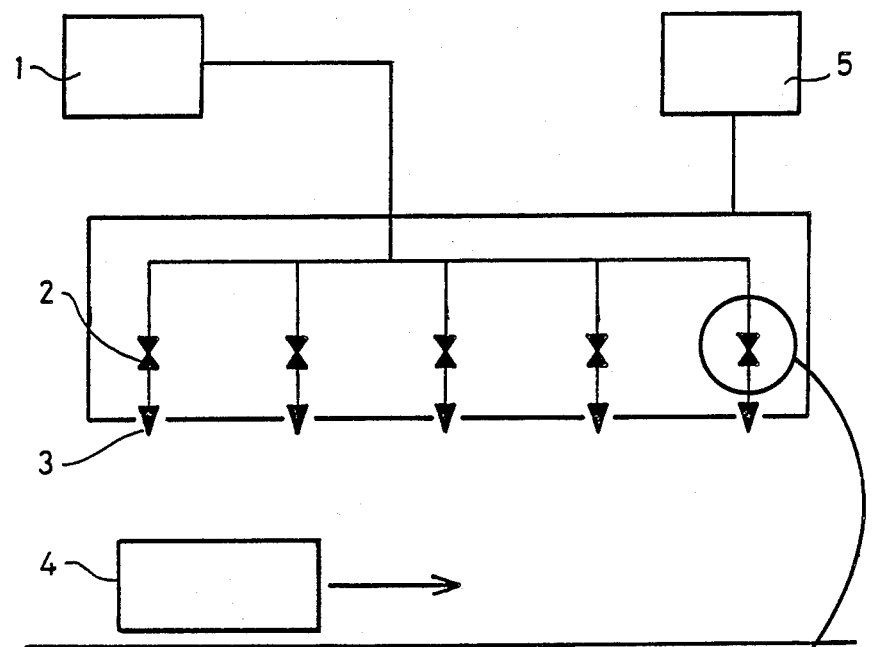
FIG. 1(a): a schematic representation of the operation of air ink jet printer in accordance with the method of the invention.
Figure 1B:
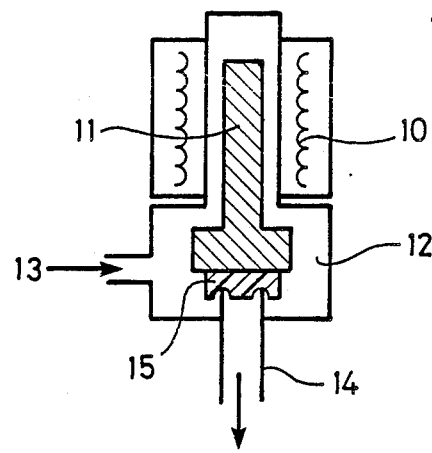
FIG. 1(b): a diagrammatic cross-section through a solenoid valve used in the ink jet printer of FIG. 1(a).

A drop on demand ink jet printer comprises an ink reservoir 1 operated under pressure which feeds ink to a bank of solenoid valves 2 each controlling the flow of ink to a nozzle 3 in a print head comprising an array of the nozzles. The print head is to apply droplets to packages 4 or other articles carried transversely past the print head. The valves are operated in the desired sequence by a programmable controller 5 to apply the desired image, e.g. a bar code, alphanumeric symbol or other image, to the package. Such a printer can be of conventional design, construction and operation and many forms of such a printer are available commercially.

The valve 2 comprises a coil 10 within which is reciprocably journalled a magnetisable plunger 11. The plunger extends into a chamber 12 located at one end of the valve and into which ink is fed via inlet 13 from the reservoir 1 and from which ink can flow to the nozzle 3 through outlet 14. The valve can have a tangential inlet as shown, or the inlet can be located at the opposed end of the valve so that the ink flows axially though the valve around the plunger 11 and into the chamber 12. The plunger 11 can take a number of forms, but is preferably a generally cylindrical member carrying a sealing disc 15 on that end (the valve head) located within the chamber 12. The valve head can be formed as a wider end section to the plunger so that it resembles a mushroom head if desired.

The sealing disc 15 is made from any suitable material, for example a natural or synthetic rubber or resin. The sealing disc 15 engages the open end of the outlet tube 14 which extends through the end wall of the chamber 12 or with one or more sealing ribs formed on the inner face of the end wall and surrounding the entry to the outlet 14. The plunger is normally urged into valve closed position by a spring (not shown) so that the sealing disc 15 bears against the rim of the outlet tube 14 when ever the valve is in the closed position. In an alternative design, the sealing material can be located around the rim of the outlet tube, e.g. as upstanding ribs or the like, which engage with the end face of the plunger 11.

The above form of valve is conventional and many forms of such valves are available commercially.

As indicated above, we believe that the problem of erratic droplet formation is at least in part due to creep occurring in the material of the sealing disc 15. In severe cases, for example after the valve has been left in the closed position continuously for long periods, the rim of the outlet 14 may become sufficiently imbedded in the sealing disc 15 for the material of the disc to deform around the outer edge of the tube 14 and act to provide positive grip between the plunger and the outlet tube.

In order to reduce the effect of this on drop ejection performance, a transient current is applied to the coil 10 to cause the plunger 11 to retract slightly from the changer 12. This has the effect of breaking the adherence between the disc and the outlet so that the drive stroke of the valve can be executed as designed to give the desired droplets.

The transient current required to achieve the desired effect will depend upon many factors, for example the material from which the disc 15 is made and the pressure exerted by the return spring. On the other hand, the transient current should not cause the disc 15 to move away from the outlet 14 suffficiently to allow fluid to flow through the valve. The optimum value for the current applied and its duration can be readily determined by simple trial and error tests, but we have found that the current will usually be in the range of from 50 to 100% of that required to drive the plunger for its opening stroke, and that the duration of the transient current will be from 25 to 50% of the duration of the drive current application. Typically, the transient current will be applied at a frequency of from 50 to 500 Hz.

The transient current can be applied immediately preceeding each drive current application. However, it will usually be necessary to apply the transient current independently of the drive current so that performance benefit is obtained immediately after periods when the valve has been at rest with no drive current applied. Thus, it will usually be preferred to apply the transient current whenever the time between one drive stroke and the next exceeds a specified period. The value of this period will vary from valve to valve and can be readily determined by simple trial and error.

Once the value and duration of the transient current and the intervals at which it is to be applied have been established, these can be incorporated into the programmed instructions under which the controller controlling the operation of the ink jet printer operates using the appropriate conventional programming techniques. Since the invention requires the use of program variations for its operation, the invention can readily be applied both to new and existing ink jet printers with little or no modification of the printer mechanisms. The invention can thus be applied to a wide range of ink jet printers to reduce the problems encountered during the initial printing of droplets from one or more of the nozzle orifices.

Figure 2:
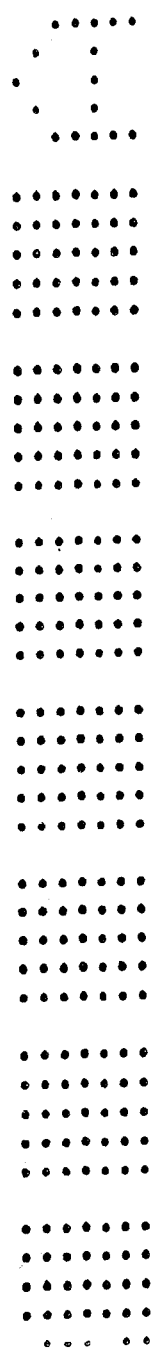
FIG. 2: ink droplet pattern of a conventional ink jet printer.

By way of example, a commercially available drop on demand ink jet printer sold under the trade mark Willett 3200 by Willett Systems Limited was operated in the conventional manner without the use of any transient current applications. When the printer was stood at rest for periods in excess of 1 minute, problems with erratic or missed initial droplets were encountered. A typical droplet pattern produced from one of the nozzles is shown in FIG. 2.

Figure 3:
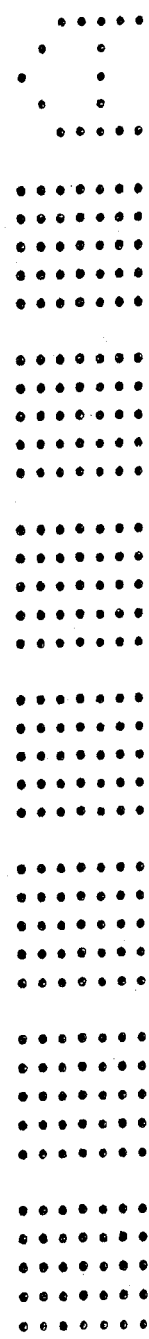
FIG. 3: ink droplet pattern produced using the method of the invention.

By way of contrast, when a transient current of 130 mA was applied for 0.25 milleseconds at a frequency of 200 Hz, the initial droplet pattern after a rest period of 1 minute was as shown in FIG. 3. As will be seen, the droplet pattern in FIG. 3 shows none of the erratic or missing droplets of FIG. 2.

What I claim is:

1. A method for operating an electromagnetic valve means comprising a valve plunger journalled within a valve body for movement under the influence of an electric current on a drive stroke from a valve closed position to a valve open position, which valve means controls the flow of fluid to a nozzle orifice in a non-contact fluid droplet applicator apparatus, which method comprises intermittently applying a transient drive current to the valve means which is insufficient to move the plunger sufficiently on its drive stroke towards the valve open position to permit the flow of fluid through the valve.

2. A method as claimed in claim 1 wherein the non-contact fluid applicator is a drop on demand ink jet printer and the valve means is a solenoid valve controlling the flow of ink through a nozzle of the ink jet printer.

3. A method as claimed in claim 1 wherein the transient drive current is from 50 to 100% of that required to move the plunger on its drive strike to the valve open position and the transient drive current has a duration which is from 25 to 50% of the duration of the current applied to the valve plunger for its drive stroke to the valve open position, whereby the application of the transient drive current is insufficient to move the plunger towards the valve open position and allow fluid to flow through the nozzle orifice.

4. A method as claimed in claim 1 wherein a transient drive current having as value of from 50 to 100% of the transient drive current required to open the valve is applied at a frequency of from 50 to 500 Hz for a duration which is from 25 to 50% of the duration of the transient drive current required to open the valve.

5. A method as claimed in claim 1 wherein the valve means comprises a coil wound around a body portion of the valve, within which body is reciprocably journalled a magnetisable plunger which extends into a chamber located at one end of the valve body, a fluid inlet located at the opposite end of the valve body to the chamber whereby the fluid flows axially through the valve around the plunger and through the chamber to an outlet with which a seal member carried by the plunger co-operates to close or open the outlet from the chamber.

6. A method as claimed in claim 5 wherein the plunger is a generally cylindrical member carrying a sealing disc on that end located within the chamber, which disc engages the open end of an outlet tube which extends through an end wall of the chamber.

7. A non-contact fluid droplet applicator which is adapted to emit droplets of fluid upon the operation of a valve means under the control of a programmed control means, characterised in that the said control means is programmed to apply a transient drive current to the valve means which current is insufficient to move the plunger sufficiently on its drive stroke towards the valve open position to permit the flow of fluid through the valve.

8. A programmable control means for operating a valve means to regulate the flow of fluid in a non-contact fluid droplet applicator, which control means has been programmed to cause a transient drive current to be applied to the valve means which current is insufficient to move the plunger sufficiently on its drive stroke towards the valve open position to permit the flow of fluid through the valve.

* * * * *